(12) United States Patent
Barocio et al.

(10) Patent No.: US 11,806,934 B2
(45) Date of Patent: Nov. 7, 2023

(54) METHODS AND APPARATUS FOR ADDITIVE MANUFACTURING UTILIZING MULTIFUNCTIONAL COMPOSITE MATERIALS, AND ARTICLES MADE THEREFROM

(71) Applicant: Purdue Research Foundation, West Lafayette, IN (US)

(72) Inventors: Eduardo Barocio, West Lafayette, IN (US); Jorge A. Ramirez, West Lafayette, IN (US); Miguel Angel Ramirez, Lafayette, IN (US); Bastian Brenken, Nottensdorf (DE); Robert Byron Pipes, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/567,146

(22) Filed: Jan. 2, 2022

(65) Prior Publication Data

US 2022/0371282 A1 Nov. 24, 2022

Related U.S. Application Data

(62) Division of application No. 16/384,235, filed on Apr. 15, 2019, now Pat. No. 11,214,006.

(Continued)

(51) Int. Cl.
| | |
|---|---|
| *B29C 64/336* | (2017.01) |
| *B33Y 10/00* | (2015.01) |
| *B33Y 30/00* | (2015.01) |
| *B33Y 40/00* | (2020.01) |
| *B29C 64/118* | (2017.01) |
| *B29C 64/209* | (2017.01) |
| *B33Y 70/10* | (2020.01) |
| *B33Y 70/00* | (2020.01) |

(Continued)

(52) U.S. Cl.
CPC ............ *B29C 64/336* (2017.08); *B22F 10/18* (2021.01); *B22F 12/53* (2021.01); *B22F 12/58* (2021.01);

(Continued)

(58) Field of Classification Search
None
See application file for complete search history.

(56) References Cited

U.S. PATENT DOCUMENTS 10,046,511 B1 * 8/2018 Mantha ................. B29C 64/118
2016/0144565 A1 * 5/2016 Mark .................... B29C 64/106
425/166

(Continued)

*Primary Examiner* — Yung-Sheng M Tsui
(74) *Attorney, Agent, or Firm* — Purdue Research Foundation

(57) ABSTRACT

A method of depositing a multiphase material. The method includes providing a Continuous Multifunctional Composite (CMC) phase containing at least one continuous element in a polymeric matrix, passing the CMC phase through a feeding system containing a cutting system, producing a predetermined length of the CMC phase, providing a flow a molten polymer such that the molten polymer and the CMC phase are merged into a continuous co-extrusion nozzle so as to produce a co-extruded multiphase material, and depositing the co-extruded multiphase material onto a surface. An apparatus for depositing a multiphase material. The apparatus contains a co-extrusion nozzle, a means to introduce a CMC phase and a molten polymer into the co-extrusion nozzle, such that the molten polymer and the CMC phase are co-extruded and deposited on a surface. An article containing a CMC phase containing continuous elements embedded in a polymer resin forming a multiphase structure.

3 Claims, 9 Drawing Sheets

Related U.S. Application Data

(60) Provisional application No. 62/658,366, filed on Apr. 16, 2018.

(51) Int. Cl.
    *B22F 10/18* (2021.01)
    *B22F 12/53* (2021.01)
    *B22F 12/58* (2021.01)
    *B22F 12/57* (2021.01)

(52) U.S. Cl.
    CPC .......... *B29C 64/118* (2017.08); *B29C 64/209* (2017.08); *B33Y 10/00* (2014.12); *B33Y 30/00* (2014.12); *B33Y 40/00* (2014.12); *B33Y 70/00* (2014.12); *B33Y 70/10* (2020.01); *B22F 12/57* (2021.01)

(56) References Cited

U.S. PATENT DOCUMENTS

| | | | |
|---|---|---|---|
| 2016/0368213 A1* | 12/2016 | Mark | B33Y 50/02 |
| 2017/0129182 A1* | 5/2017 | Sauti | B29C 64/30 |
| 2017/0326802 A1* | 11/2017 | Mark | B29C 70/20 |
| 2017/0368739 A1* | 12/2017 | Brennan | B33Y 30/00 |
| 2018/0056606 A1* | 3/2018 | Hoffman | B29C 64/20 |
| 2018/0117851 A1* | 5/2018 | Reese | B29C 64/209 |
| 2018/0264688 A1* | 9/2018 | Jaker | B33Y 30/00 |
| 2018/0281279 A1* | 10/2018 | Barocio | B29C 64/165 |
| 2019/0160746 A1* | 5/2019 | Anegawa | B33Y 70/10 |
| 2019/0225808 A1* | 7/2019 | Naskar | B29C 64/118 |
| 2020/0139694 A1* | 5/2020 | Armijo | B33Y 30/00 |
| 2020/0156310 A1* | 5/2020 | Shah | B29C 64/268 |

\* cited by examiner

METHODS AND APPARATUS FOR ADDITIVE MANUFACTURING UTILIZING MULTIFUNCTIONAL COMPOSITE MATERIALS, AND ARTICLES MADE THEREFROM

CROSS-REFERENCE TO RELATED APPLICATIONS

The present U.S. patent application is a divisional application of U.S. patent application Ser. No. 16/384,235, filed Apr. 15, 2019, and is related to and claims the priority benefit of U.S. Provisional Patent Application Ser. No. 62/658,366, filed Apr. 16, 2018, the contents of which are hereby incorporated by reference in their entirety into the present disclosure.

STATEMENT REGARDING GOVERNMENT FUNDING

This invention was made with government support under DE-EE0006926 awarded by the Department of Energy. The government has certain rights in the invention.

TECHNICAL FIELD

This disclosure relates to additive manufacturing methods and apparatus and especially to methods and apparatus for additive manufacturing of articles by co-extruding continuous multifunctional composite materials, and articles made using such methods and apparatus.

BACKGROUND

This section introduces aspects that may help facilitate a better understanding of the disclosure. Accordingly, these statements are to be read in this light and are not to be understood as admissions about what is or is not prior art.

The technology of Extrusion Deposition Additive Manufacturing (EDAM) involves manufacturing three-dimensional geometries by depositing beads of molten material in a layer-by-layer basis. EDAM is a screw extruder-based process that has enabled processing high-temperature and highly reinforced polymer composites that otherwise could not be processed with traditional filament-based processes due to the high viscosity of the reinforced polymer. Further, printing structures of the large-scale size (meters) has become feasible due to advancements in the printing materials and the EDAM technology, Specific advancements include the reduction in coefficient of thermal expansion (CTE) and the increase in stiffness gained along the print direction by reinforcing printing polymers with discontinuous fibers as described in literature. Previous work has focused on printing with carbon fiber reinforced Polyphenylene Sulfide (PPS), which is a semi-crystalline high-temperature polymer processed at 310° C. Examples of commercially available extrusion deposition additive systems are the LSAM® developed by Thermwood® and the BAAM® developed by Cincinnati Inc®.

The EDAM process of polymer composites utilizes pelletized composite material that contains discontinuous fibers impregnated with polymer. The pelletized material can take the form of Long Discontinuous Fiber (LDF) or compounded composite with the primary difference in the initial fiber length where LDF lengths are in the range of 10,000 microns, whereas fiber length in compounded material is typically below 500 microns. The pelletized material is fed into a single-screw extrusion system that melts and applies pressure to the printing material. Two primary sources of heat drive the melting process of the polymer in a screw-based extrusion system. The first one is the heat supplied externally from heaters and the second is the viscous dissipation (shear heating) in the polymer. This mechanism requires substantial mechanical energy that results in fiber fracture and thereby, fiber length attrition. After flowing through the extruder, the molten polymer composite enters the printing nozzle where converging zones cause the fibers to orient in the print direction, thereby introducing anisotropy in the mechanical, thermal and flow properties of the extrudate. In the context of this disclosure, the term "extrudate" refers to the physical entity resulting from an extrusion process or a co-extrusion process. Co-extrusion refers to extrusion of more than one material or phase together to form a physical entity. Upon leaving the nozzle, the composite material is first deposited on an actively heated build plate and in subsequent passes it is deposited on previously deposited material substrate layers. Finally, the deposited extrudate is consolidated with a compaction mechanism in order to reduce extrudate thickness and to consolidate the extrudate with adjacent deposited layers.

Fiber attrition in the extrusion process of the polymer composite additive manufacturing is one of the factors limiting the strength in a printed component. Therefore, current applications for EDAM with composites has been limited to non-structural applications Hence, there exists an unmet need for methods and apparatus for additive manufacturing of polymer composites by extrusion without reducing or limiting the strength of a printed component or article.

SUMMARY

A method of depositing a multiphase material is disclosed. The method includes providing a CMC phase containing at least one continuous element comprising at least one material impregnated in a polymeric matrix, passing the CMC phase containing the at least one continuous element through a feeding system containing a cutting system, producing a predetermined length of the CMC phase containing at least one continuous element by activating the cutting system, providing a flow a molten polymer such that the molten polymer and the CMC phase containing at least one continuous element of predetermined length are merged into a continuous co-extrusion nozzle so as to produce a co-extruded multiphase material, and depositing the co-extruded multiphase material onto a surface.

An apparatus for depositing a multiphase material is disclosed. The apparatus contains a feedings system capable of continuously feeding a CMC phase containing continuous elements, and containing a cutting system capable of producing a predetermined length of the CMC phase containing continuous elements; a co-extrusion nozzle comprising a flow channel; a means to introduce the predetermined length of the CMC phase containing continuous elements into the flow channel of the co-extrusion nozzle; and a means to introduce a molten polymer into the flow channel such that the molten polymer and the predetermined length of the CMC phase containing continuous elements are co-extruded and deposited on a surface.

An article containing a CMC phase containing continuous elements embedded in a polymer resin forming a multiphase structure is disclosed.

BRIEF DESCRIPTION OF DRAWINGS

Some of the figures shown herein may include dimensions. Further, some of the figures shown herein may have been created from scaled drawings or from photographs that are scalable. It is understood that such dimensions or the relative scaling within a figure are by way of example, and not to be construed as limiting.

DETAILED DESCRIPTION

Figure 1:
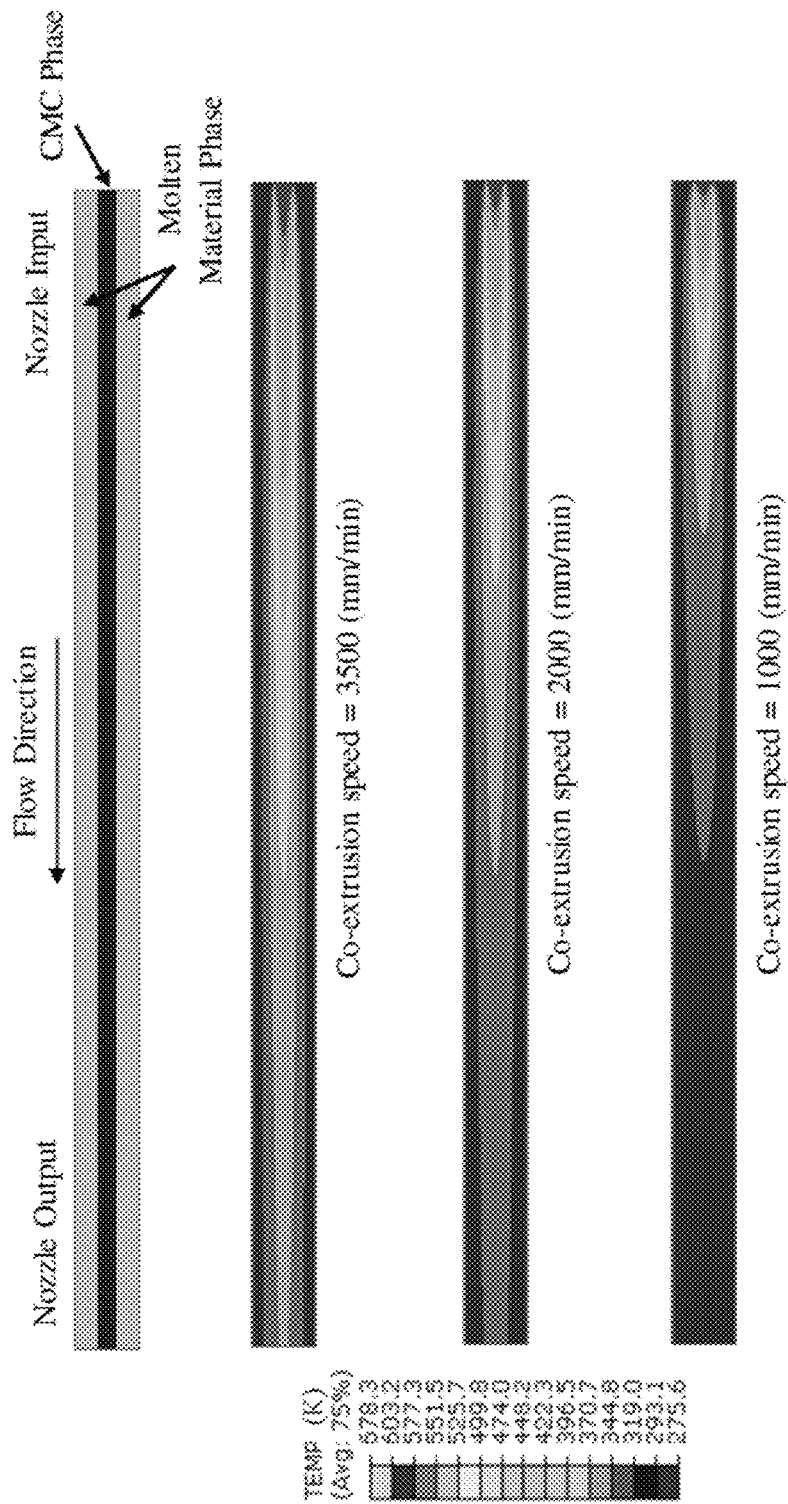
FIG. 1 shows the steady state temperature distribution in the multiphase material system co-extruded at different speeds.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended.

This disclosure describes methods and apparatus to continuously and/or selectively print with material systems containing at least two phases. One phase can contain unreinforced polymeric material or polymeric material reinforced with fillers. Examples of such fillers used for reinforcing include, but are not limited to, organic fillers, mineral fillers, discontinuous fibers made of carbon, glass, aramid, or natural fibers such as jute. This phase containing unreinforced polymeric material or polymeric material reinforced with fillers is called a discontinuous phase in this disclosure. A second phase can contain continuous elements impregnated with a polymeric matrix. These continuous elements include, but are not limited to, carbon fibers, glass fibers, aramid fibers, heating wires, sensing wires or a combination of multiple of these. For purposes of this disclosure, these are referred to as continuous elements and the phase containing the continuous elements is termed CMC (Continuous Multifunctional Composite) phase. Further, continuous elements are not limited to function as structural, sensing, heating or cooling elements. The polymeric materials that can be used in each phase includes, but is not limited to, thermoplastics, thermosets or elastomers. It should be noted that the word "phase" in the context of this document is used to refer to one of the multiple material forms utilized in the co-extrusion additive manufacturing process disclosed herein, rather than to the individual constituents of such a material form.

The wide range of possible combinations of continuous elements within a single phase led to the creation of the concept of Continuous Multifunctional Composite (CMC) to refer to the phase of continuous elements fully impregnated with a polymeric material. The phrase "first phase" refers to the phase containing molten material that is co-extruded with the CMC phase. The phrase "second phase" is used in the context of this disclosure to refer to continuous elements contained in a polymeric matrix and is analogous to the CMC. It should be recognized that the concepts and methods and apparatus of this disclosure are not limited to printing with two phases only. Those skilled in the art will recognize that the concepts of the methods and the apparatus of this disclosure can be extended to include printing with more than two phases or just one phase.

In one embodiment of the methods of this disclosure, additive manufacturing of an article containing CMC involves the following steps. First, feeding the CMC from a storage container or spool into a co-extrusion nozzle. Second, cutting the CMC to a predefined length to allow selective placement of CMC within an additively manufactured article. Third, co-extruding the CMC with a phase containing molten polymer to provide thermal energy for melting the polymer in the CMC. Fourth, depositing the coextruded material system on a surface.

The method for printing with continuous elements disclosed herein overcomes three primary limitations found in prior-art related to filament-based methods for printing with continuous elements. These prior art methods are described in U.S. Pat. No. 9,126,365 B1 titled "Methods for composite filament fabrication in three dimensional printing" issued to Mark et al. on Sep. 8, 2015. Additional prior art related to printing with continuous fibers is described in U.S. Pat. No. 9,511,543 B2 titled "Methods and apparatus for continuous composite three-dimensional printing" and issued to Tyler on Dec. 6, 2016. The contents of these prior art patents mentioned above are incorporated by reference in their entirety into this disclosure. These prior-art filament-based methods only allow printing with filament feedstock materials and are referred to as fused filament fabrication or fused deposition modeling. In these methods, melting of the polymeric material is achieved only through thermal diffusion from the extrusion nozzle to the filament. Therefore, the limitations include, 1) the incomplete impregnation of continuous elements with polymer inside a phase as well as the incomplete impregnation of this phase with the surrounding phases; 2) the limited deposition rate controlled by the time necessary to diffuse thermal energy from an extrusion nozzle to a filament containing continuous elements. Thermal diffusion is required to melt the polymer matrix in the filament and thus to allow pressure flow of the material through the orifice of the extrusion nozzle; and 3) the need for interrupting the printing process to deposit filament with continuous elements during the AM process of an article.

Printing with multi-phase materials can be accomplished by a co-extrusion process where the CMC is fed into a co-extrusion nozzle conveying a phase with molten material. The molten phase can be either a reinforced or non-reinforced thermoplastic, thermoset or elastomer. As the CMC enters the co-extrusion nozzle, the CMC is combined with molten polymeric material. The molten polymer material can be supplied by a single-screw extruder or by an extrusion melt pump. In these cases the phase in the molten state can result from the extrusion of a pelletized feedstock material. The pressure built inside the nozzle enhances wetting of the surface of the CMC with the molten polymer, thereby reducing the thermal resistance to diffuse thermal energy from the molten phase into the second or multiple phases. Clearly, thermal diffusion is driven by the temperature difference between the phase with molten material and the CMC phase, which enters the nozzle in the solid state. Additional thermal energy is supplied to the multi-phase material system from the surface of the flow pathway in the co-extrusion nozzle. The diffusion of sufficient thermal energy for melting the polymer in the CMC phase involves a characteristic time that depends on the diameter and initial temperature of the CMC phase. Further, the multi-phase material system flows at a given velocity through the flow pathway in the co-extrusion nozzle, thereby giving rise to a minimum co-extrusion distance required for melting the polymer in the CMC phase.

A CMC phase containing continuous elements with high elastic modulus can only experience a small bending radius in the solid state before damaging the CMC. To prevent this condition, the polymeric material in the CMC must be in the molten state to allow relative displacement of the continuous elements and thereby allowing bending of the CMC in a small radius. An example of a small bending radius developed during the additive manufacturing process of an article occurs as the coextruded material turns from the co-extrusion direction (nozzle direction) to the deposition direction (perpendicular to the nozzle direction). In the case that the polymeric material in the CMC remains is the solid state, excessive stresses can develop in the CMC, thereby causing the rupture of continuous elements.

Designing a nozzle that ensures melting of the polymer in the CMC phase at the end of the nozzle involved performing a transient heat transfer analysis for predicting the temperature evolution in the phases flowing through the co-extrusion nozzle. The following heat equation was derived by carrying out an energy balance around an infinitesimal element considered inside the co-extrusion nozzle. To capture the energy conveyed with the fluid flow, the advection term, $$\rho C_p v_z \frac{\partial T}{\partial z},$$

was included in the heat equation. The velocity of the flow $v_z$ represents the co-extrusion speed defined in the Z direction in a Cartesian coordinate system. The density $\rho$ and the heat capacity $C_p$ are also in the advection term.

$$\frac{\partial}{\partial x}\left(k_x \frac{\partial T}{\partial x}\right) + \frac{\partial}{\partial y}\left(k_y \frac{\partial T}{\partial y}\right) + \frac{\partial}{\partial z}\left(k_z \frac{\partial T}{\partial z}\right) - \rho C_p v_z \frac{\partial T}{\partial z} + \dot{q} = \rho C_p \frac{\partial T}{\partial t} \quad (1)$$

Orthotropic thermal diffusion is described through the three thermal conductivities $k_i$, i=x, y, z. In addition to the diffusion and advection terms, an external heat source $\dot{q}$ is included to account for the latent heat associated with phase change. For the case of the material considered in the investigations that led to this disclosure, this term captures the thermal energy that is either absorbed in the event of melting of polymer crystals or released in the event of polymer crystallization. The polymeric material considered in the CMC phase consists of a semi-crystalline polymer, namely Polyphenylene Sulfide (PPS). The boundary conditions for crystallinity considered at the inlet of the co-extrusion nozzle for the CMC phase and the molten phase were fully crystallized (e.g. $X_{vc}=X_{vc\infty}$) and fully molten (e.g. $X_{vc}=0$), respectively. Two models, one describing polymer crystallization and other describing polymer melting, were used to describe the evolution of crystallinity in the domain of the multiphase material system. The crystallization process is temperature and time dependent and thus the model proposed in literature by Velisaris and Seferis was used. This model describes the evolution of crystallinity as a function of two mechanisms described by integral expressions $F_{vc_i}$, i=1, 2 and weighted through the weighting factors $w_i$, i=1, 2. The maximum fraction of crystallinity $X_{vc\infty}$ multiplies the sum of the two weighted integral expressions that vary from zero to one to define the degree of crystallinity.

$$X_{vc}(T,t)=X_{vc\infty}(w_1 F_{vc_1}+w_2 F_{vc_2}) \quad (2)$$

Similarly, the melting process of the crystalline regions in the polymer are described using the model developed by Greco and Maffezzoli and reported in literature. This model assumes a statistical distribution of polymer crystal lamellar thickness and thus the melting process is only temperature dependent.

$$\frac{dX_{vc}}{dT} = k_{mb}\{\exp[-k_{mb}(T-T_c)]\}\cdot(1+(d-1)\exp[-k_{mb}(T-T_c)])^{\frac{d}{1-d}} \quad (3)$$

where $k_{mb}$ and d capture the sharpness and the shape factor of the distribution of lamellar thickness, respectively. $T_c$ Is the temperature recorded at the energy peak of the exothermic reaction recorded in DSC experiments. Due to the consistent distribution of crystal lamellar thickness formed at different cooling rates, the transition between the crystallization and melting models is defined by the following temperature condition.

$$X_{vc}(T) = \begin{cases} T > T_m^*, & X_{vc}(T) - \text{Melting} \to \text{Equation 3} \\ T \le T_m^*, & X_{vc}(T) - \text{Crystallization} \to \text{Equation 2} \end{cases} \quad (4)$$

$$X_{vc} \in [0\ 1]$$

where $T_m^*$ is the temperature at the onset of melting. Similar to the heat transfer analysis, the effect of the material flow must be considered in the evolution of crystallinity during the co-extrusion process. Therefore, the material derivative of the degree of crystallinity is carried out and rearrange as given by Equation 5 to describe the evolution of the crystallinity in an Eulerian frame of reference.

$$\frac{\partial X_{vc}}{\partial t} = \frac{DX_{vc}}{Dt} - \frac{\partial X_{vc}}{\partial z}v_z \quad (5)$$

The analysis described above was implemented in a UMATHT user subroutine and solved numerically using the commercial finite element package ABAQUS® known in the literature. Initial conditions for crystallinity and temperature were imposed in the heat transfer analysis as well as the respective temperature boundary conditions at the inlet and body of the nozzle. Initial and boundary conditions at the inlet of the co-extrusion nozzle for the CMC were assumed at constant room temperature. Similarly, the PPS processing temperature (300° C.) was used for the initial and boundary conditions at the inlet of the co-extrusion nozzle of the second phase since this enters the co-extrusion nozzle while is molten. A constant temperature boundary condition was imposed on the wall of the co-extrusion nozzle. The two phases considered in this analysis include a CMC phase containing PPS reinforced with 40% by volume of carbon fiber and a molten phase containing PPS reinforced with 50% by weight of discontinuous carbon fiber. The material properties utilized in the heat transfer analysis were predicted utilizing micromechanics methods and characterized experimentally for the continuous and discontinuous phases, respectively.

The heat transfer, polymer melting and polymer crystallization analysis provided predictions of the temperature and crystallinity distributions in the multiphase material during the co-extrusion process. Referring to the top section in FIG. 1, a cross-sectional view of the co-extrusion nozzle shows an schematic representation of the multiphase material system containing a CMC phase (dark) and a molten phase (grey), the second section from the top in FIG. 1 shows the steady state temperature distribution developed in the multiphase material system for the co-extrusion speed of 3500 mm/min.; the third section from the top in FIG. 1, shows the steady state temperature distribution developed in the multiphase material system for the co-extrusion speed of 2000 mm/min; and, the fourth section from the top in FIG. 1 shows the steady state temperature distribution developed in the multiphase material system for the co-extrusion speed of 1000 mm/min.

Figure 2:
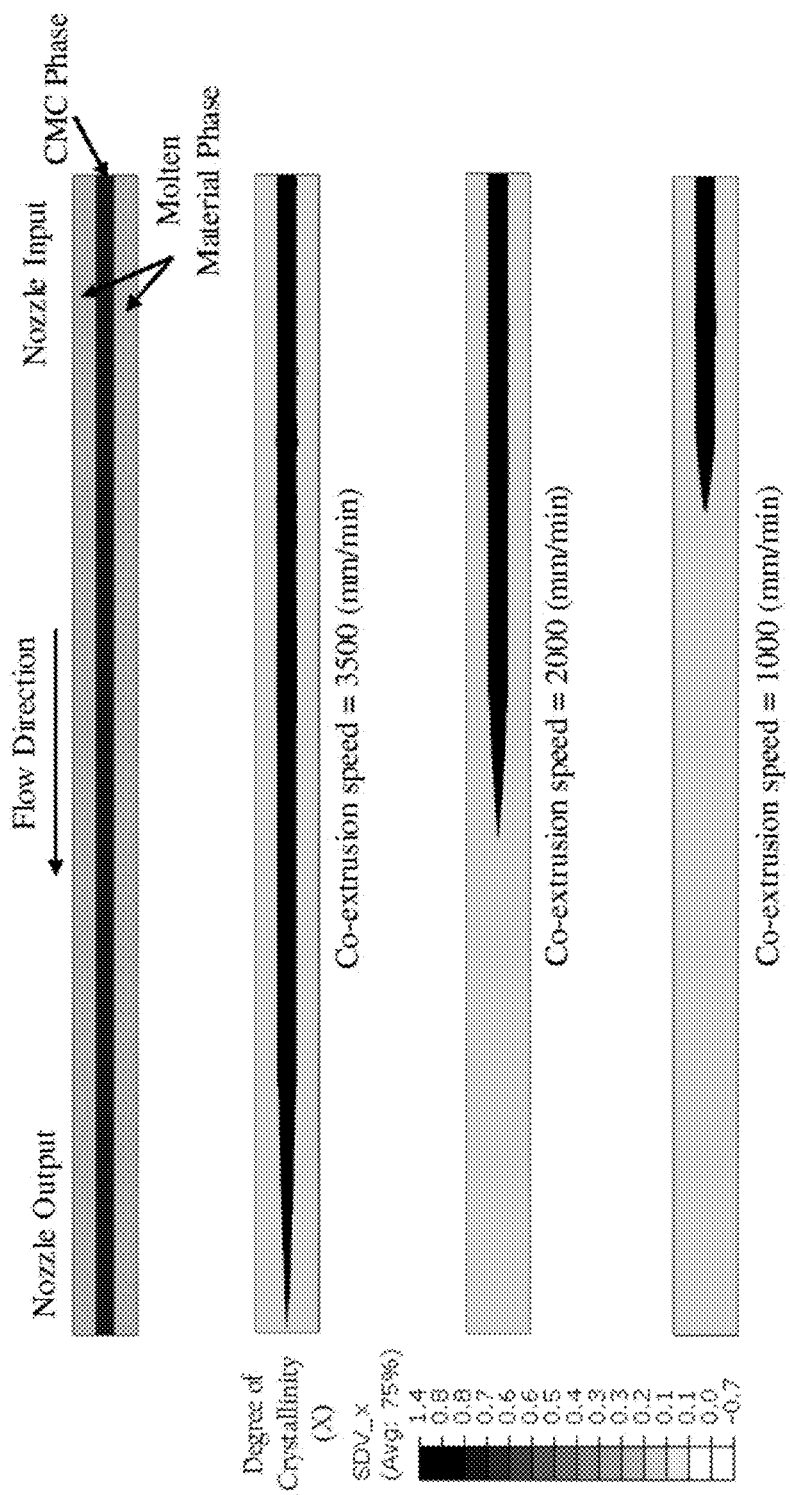
FIG. 2 shows the steady state distribution of crystallinity in the multiphase material system co-extruded at different speeds.

The degree of crystallinity in the multiphase material system also changed as a function of the co-extrusion speed. FIG. 2 shows at the top section, a cross-sectional view of the co-extrusion nozzle. In this section, the CMC phase is shown in black whereas the molten phase is shown in grey. Referring to the same FIG. 2, the second section from the top shows the steady state distribution of crystallinity developed in the multiphase material for the co-extrusion speed of 3500 mm/min.; the third section from the top shows the steady state distribution of crystallinity developed in the multiphase material for the co-extrusion speed of 2000 mm/min.; the fourth section from the top shows the steady state distribution of crystallinity developed in the multiphase material for the co-extrusion speed of 1000 mm/min. Referring to the second through the fourth regions from the top in FIG. 2, the light grey regions correspond to material that is in the molten state (amorphous polymer) whereas the dark regions indicate material that is in the solid state (crystalline polymer). FIG. 2 also shows the dependence of the co-extrusion speed on the position of the melt front along the length of the co-extrusion nozzle. While a co-extrusion speed of 1000 mm/min causes the location of the melting front closer to the inlet of the CMC phase, a co-extrusion speed of 3500 mm/min moves the melting front to a location closer to the outlet of the co-extrusion nozzle.

The process for designing the co-extrusion nozzle required first to define a target volume fraction of CMC for the co-extruded bead. A target volume fraction of 10% of CMC phase was chosen to demonstrate this technology. Considering the average diameter of an existing CMC phase (1.26 mm), a nozzle diameter of 4 mm was determined to fulfill the required volume fraction. A maximum extrusion speed of 3500 mm/min was determined based on the nozzle diameter and a throughput of 10 lb/hour given by an existing extrusion system. Upon defining these processing conditions, heat transfer analyses were performed with different nozzle lengths to determine a minimum length that ensures the polymer in the CMC phase is molten at the end of the nozzle. A nozzle length of 70 mm was found after multiple investigations. However, the length of the nozzle was extended by 2.5 mm due to geometric constraints imposed by the existing EDAM system and therefore the final nozzle length considered was 72.5 mm.

In experiments leading to this disclosure, in order to integrate the CMC phase in an existing EDAM process, a system that embodies a custom designed co-extrusion nozzle, a custom developed control algorithm, and a custom developed feeding mechanism were developed. The integration of this system in commercial EDAM machines enables selectively printing a material system containing at least two phases without interrupting the printing process. This is achieved by co-extruding multiple phases of material through the co-extrusion nozzle. During the printing process with multiple phases, the co-extrusion nozzle is actively heated and fed with at least one of the polymer phases in the molten state. A second or even multiple other phases enter the co-extrusion nozzle and merge with the flow of the molten phase. Co-extruding multiple phases have at least two advantages that differentiate this technique from existing systems for printing with continuous fiber systems. First, multiple phases in the solid state can be heated and melted as these are conveyed along with the phase in the molten state in the co-extrusion nozzle, thereby allowing deposition of multiphase material systems at higher rates. Second, the pressure developed inside the co-extrusion nozzle enhances the wetting of the solid phases with the phases in the molten state, which improves the thermal diffusion from the molten phase into the solid phases. The enhanced wetting achieved with this method also improves the bonding between different phases and the load transfer between the multiple phases.

Figure 3:
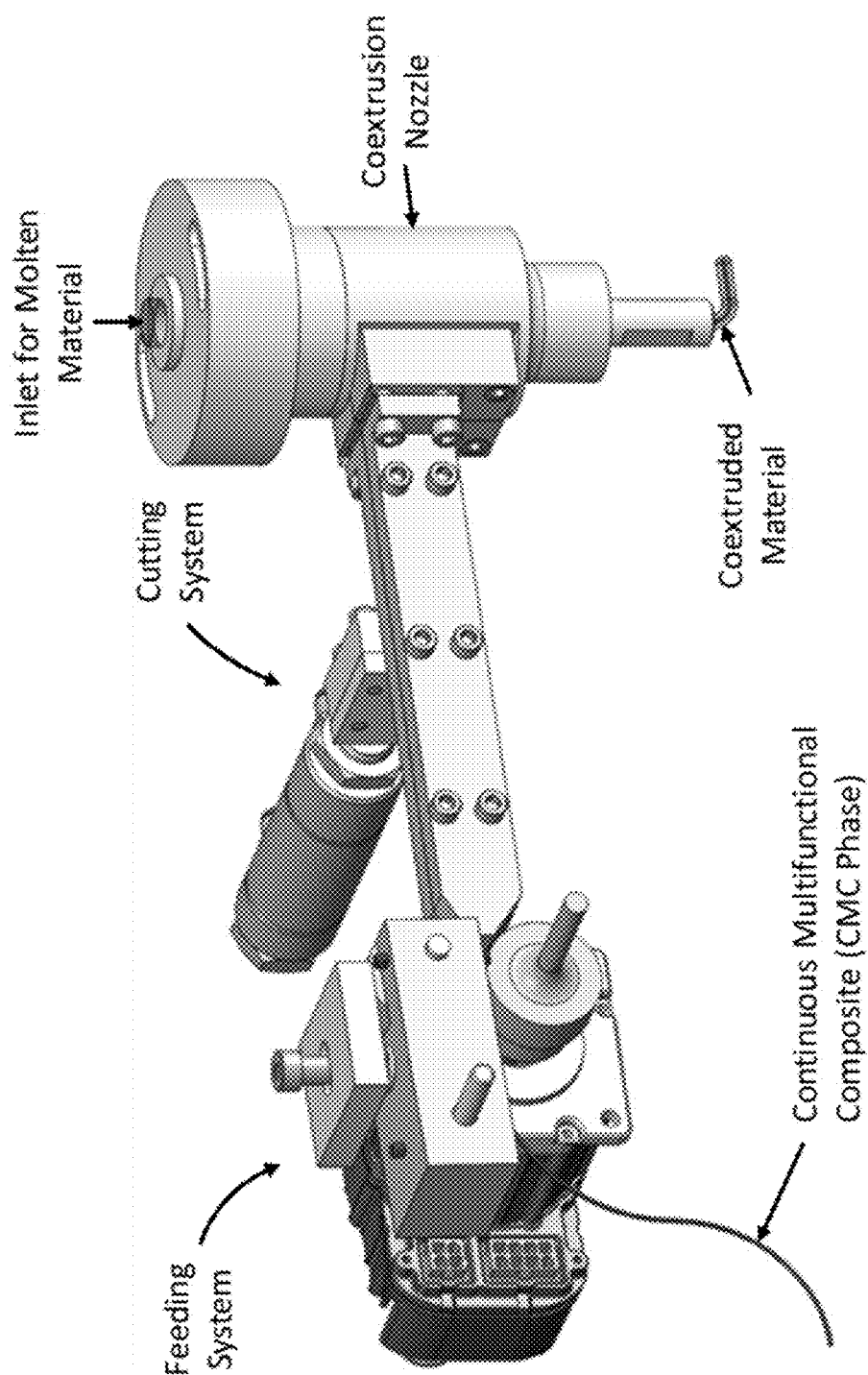
FIG. 3 shows a schematic illustration of the co-extrusion system or apparatus of this disclosure for printing with two phases (CMC phase and phase in the molten state)

The co-extrusion system or apparatus developed for printing with multiple phases was designed as a supplementary component that can be integrated in existing EDAM systems by replacing the regular extrusion nozzle with this co-extrusion system. FIG. 3 shows the co-extrusion system disclosed herein for printing with two phases, a CMC phase and a phase with molten polymer). FIG. 3 shows a schematic representation of the co-extrusion nozzle with the three primary components of a co-extrusion system: 1) The feeding system, 2) the cutting system and 3) the co-extrusion nozzle. A more detailed description of the three components in given below.

First, the feeding system contains one or multiple pairs of rollers that function as conveyors for the CMC phase. The rollers are designed to accommodate CMC elements with a wide variety of diameters and shapes. The rollers can be driven by any type of electric motor. Further, a constant pressure is maintained between each pair of rollers to maintain contact between the CMC and the rollers and to improve traction.

Second, the cutting system (see FIG. 3) contains a blade that is pressed against the CMC phase when cutting, thereby enabling to cut the CMC phase at any time during the printing process. This way, the CMC phase can be cut at predefined lengths and printed selectively. The cutting blade can be actuated via electric, pneumatic, hydraulic, or other type of mechanisms.

Third, the co-extrusion nozzle (see FIG. 3) combines CMC phase with the phase in the molten state. The phase in the molten state consist of a reinforced or non-reinforced polymer composite. The CMC phase and the phase in the molten state are pressurized, driven out of the co-extrusion nozzle, and deposited. The CMC phase is guided to enter the co-extrusion nozzle tangent to the flow of molten material. However, the feeding system can be oriented at any angle with respect to the co-extrusion nozzle. This design permits easy alignment of the CMC phase with the incoming material and prevents sharp bending of the CMC which could cause its rupture.

Figure 4A:
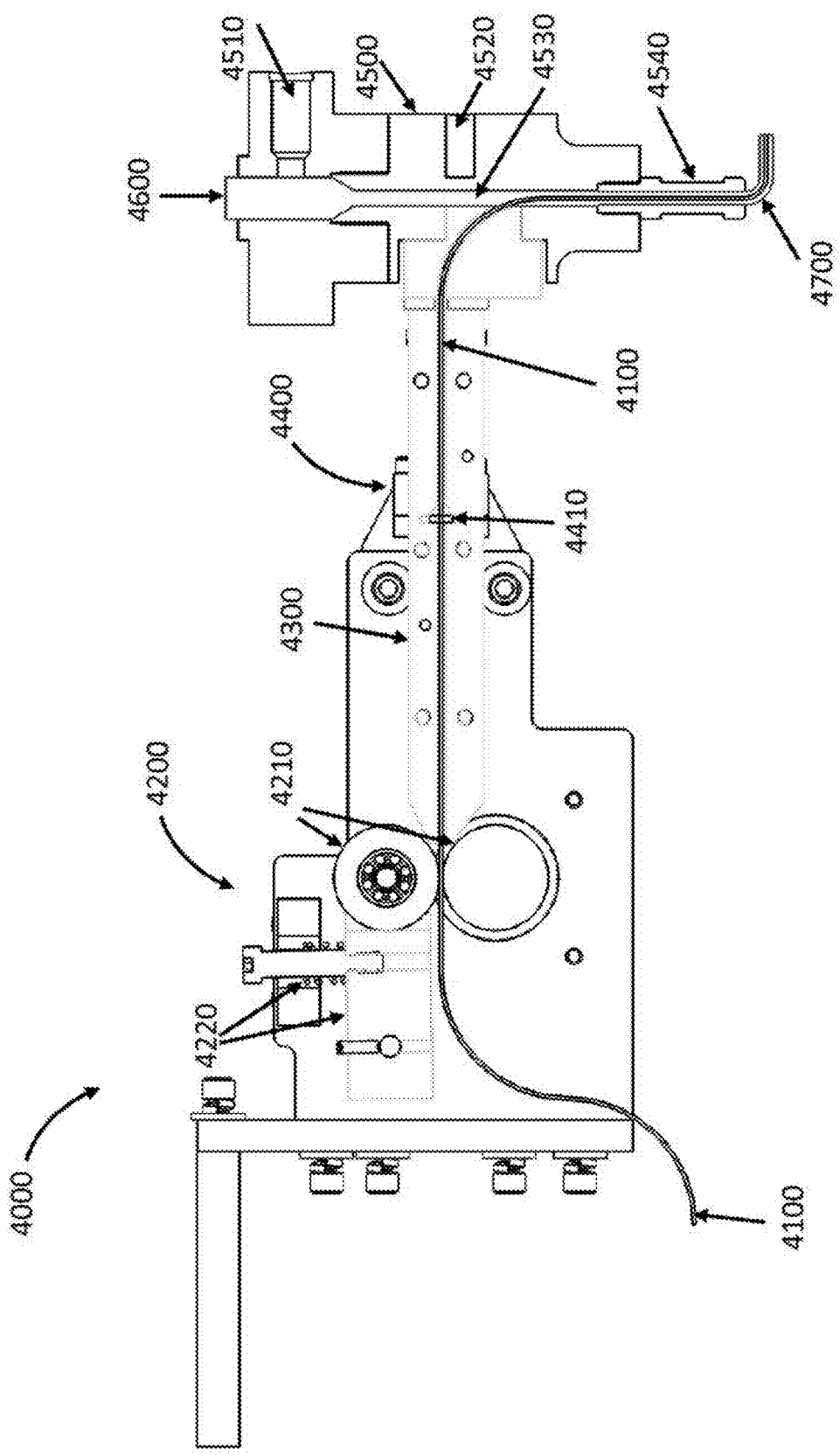
FIG. 4A shows a cross-sectional view of the co-extrusion apparatus 4000 of this disclosure with greater detail of several of its constituent parts.

FIG. 4A shows a cross-sectional view of the co-extrusion apparatus 4000 of this disclosure with detail of several of its constituent parts. Referring to FIG. 4A, CMC phase 4100 is stored in reels (not shown) that feed the feeding system 4200 of the co-extrusion apparatus 4000 with a continuous element of CMC phase 4100. The first point of contact between the co-extrusion apparatus 4000 and the CMC phase 4100 is the feeding system 4200. A non-limiting example of a feeding system contains a set of pinch rollers 4210 that compress and propel the CMC phase 4100 from the reels and into the feeding channel 4300. A constant pressure is applied across the pinch rollers 4210 through an adjustable spring loaded mechanism 4220. A non-limiting example of a cutting mechanism 4400 to size the CMC phase 4100 to the desired length is also shown in FIG. 4A. The cutting mechanisms 4400 contains a shear cutter 4410 actuated with a pneumatic piston (not shown) that trims the CMC phase 4100. The feeding channel 4300 guides the CMC phase 4100 to the co-extrusion nozzle 4500. The feeding of CMC phase 4100 into the co-extrusion nozzle 4500 can be at any desired angle. This angle can be selected for either ease entry of the CMC phase 4100 into the co-extrusion nozzle 4500 or based on the minimum allowable bending radius of the CMC phase 4100. A non-limiting example of a co-extrusion nozzle 4500 is shown in FIG. 4A. The co-extrusion nozzle 4500 contains a port 4510 for a pressure sensor (not shown) and a port 4520 for a temperature sensor (not shown). The CMC 4100 merges into the flow stream of the molten material 4600 entering the extrusion nozzle 4500. The CMC phase 4100 is combined with the phase in the molten state 4600 inside the flow pathway 4530 of the co-extrusion nozzle 4500. The co-extrusion nozzle 4500 contains the nozzle tip 4540 to allow changes in the dimensions and geometry of the flow pathway 4530. The extrudate 4700 emerging from the nozzle tip 4540 contains a multiphase material that flows through the flow pathway 4530 and emerges from the nozzle tip 4540. Clearly, the extrudate 4700 contains the CMC phase 4100 and the phase provided in the molten state 4600. It should be recognized that the nozzle tip 4540 can be changed as desired to meet the requirements of the geometry and dimensions of the extrudate 4700.

Figure 4B:
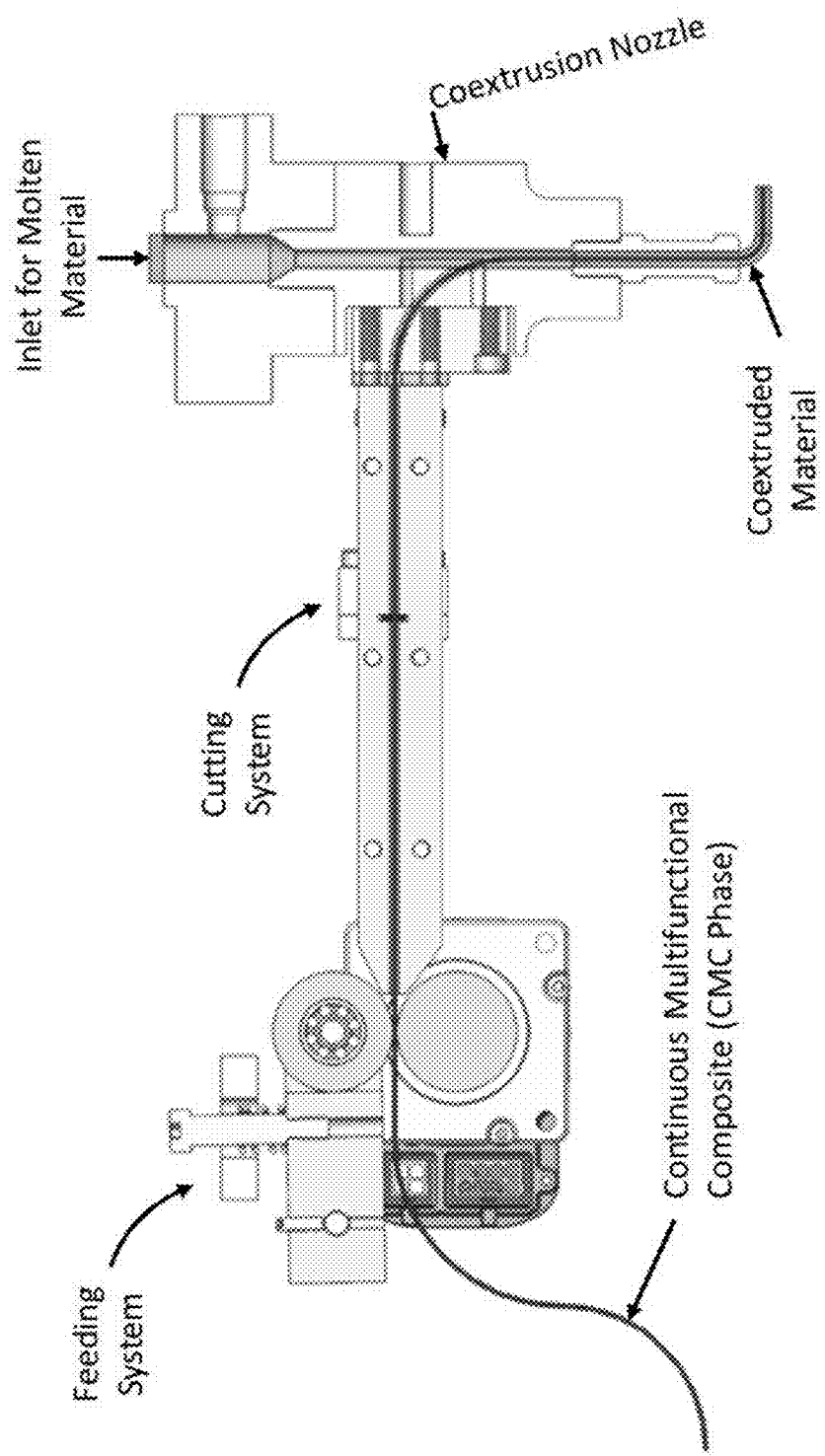
FIG. 4B shows a simplified cross-sectional view of the co-extrusion system or apparatus of this disclosure.

FIG. 4B shows a simplified cross-sectional view of the co-extrusion system or apparatus of this disclosure, showing the trajectory the CMC follows from the feeding system until the end of the co-extrusion nozzle.

Co-extruding technology has been in industry for a long time, however, the existing control systems are not suitable for utilizing this technology in the context of additive manufacturing. As a result, a novel control approach for continuously and selectively dispensing a CMC phase was developed and described in this disclosure. Further, this control approach can be readily extended to accommodate feeding multiple phases simultaneously. The structure of the control system is summarized as follows.

To start printing with CMC, an event either included in the machine code used for commanding an EDAM system or manually introduced by the user triggers the multiphase co-extrusion system. Upon this triggering, the feeder is the first component that is activated. At the same time, the control system determines through an algorithm the appropriate timing and speed required to deliver the CMC phase at the desired time and position in the printing process. The distance between the feeding system and the end of the co-extrusion nozzle is considered in the calculations of timing and feeding speeds. For the event of disabling the co-extrusion process during the printing process of an article, the control system calculates the appropriate time to stop feeding the CMC phase into the co-extrusion nozzle and triggers the cutting system. It should be mentioned that process conditions such as different co-extrusion speeds between the CMC phase and the phase in the molten state are possible with the control system.

In experiments leading to this disclosure, a polymer impregnation process for continuous elements described in U.S. Pat. No. 4,783,349 titled "Process for making fiber reinforced products" issued to Cogswell et al. on Nov. 8, 1988 was utilized to produce the CMC phase. The contents of this patent are incorporated by reference in their entirety into this disclosure. The impregnation process by pultrusion described in this patent was utilized to create the CMC phase containing continuous elements and a polymeric material. The continuous elements that can be used in a CMC phase include, but are not limited to, carbon fibers, glass fibers, metallic fibers, sensing elements, electronic elements or a combination of two or more of these elements listed. The polymeric materials that can be utilized to impregnate the continuous elements include, but are not limited to, thermosetting polymers, thermoplastic polymers or elastomers.

In addition to reinforcing printed composites, applications that will leverage the versatility of the CMC include, but are not limited to articles reinforced with CMC containing reinforcing fibers and sensors for applications of structural health monitoring in sectors such as automotive, aerospace or sporting equipment. In addition to the inclusion of this technology on existing products, the tooling industry which is undergoing a revolution with the arrival of the additive manufacturing technologies could leverage other features of the CMC like active heating or cooling in tools for compression molding, injection molding, resin transfer molding or any other polymer or composite processing tool.

Figure 5:
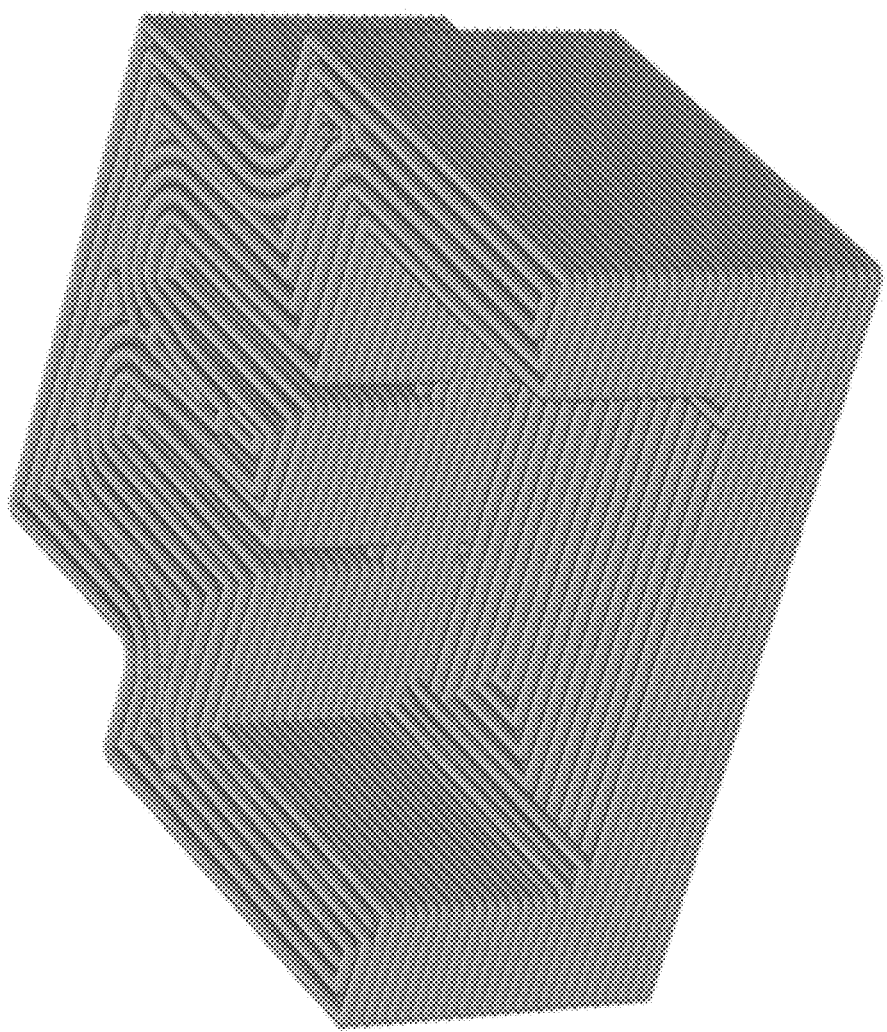
FIG. 5 shows an exemplary representation of a geometry capable of being fabricated by the apparatus of FIG. 4A and methods of this disclosure.

FIG. 5 shows a computer aided design (CAD) representation of a mold that is capable of being additively manufactured wherein selective layers can contain multiphase materials incorporated utilizing the methods and apparatus of this disclosure.

Figure 6:
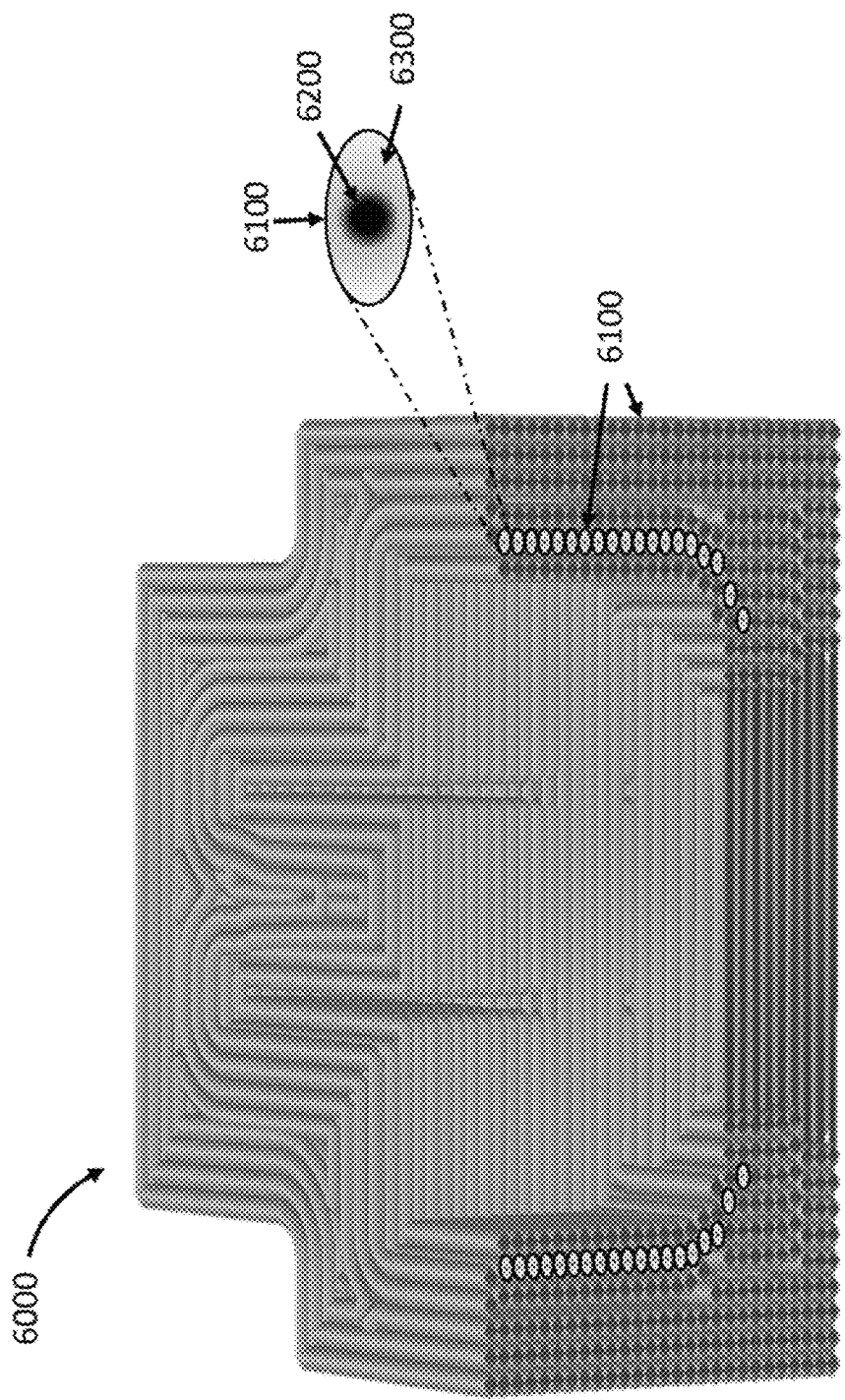
FIG. 6 shows the cross-sectional view of an exemplary article printed with a CMC phase using the methods and apparatus of this disclosure.

FIG. 6 shows a schematic representation of a cross-section of an additively manufactured mold containing a multiphase material shown as 6100. The detailed view included in FIG. 6 shows an extrudate of multiphase materials 6100 also referred to as printed bead or unit cell 6100. The extruded bead 6100 contains the CMC phase 6200, which is surrounded by the phase 6300 which can contain a polymer and discontinuous elements. The phase 6300 results from the solidification of the phase in the molten state 4600 shown in FIG. 4A.

Figure 7B:
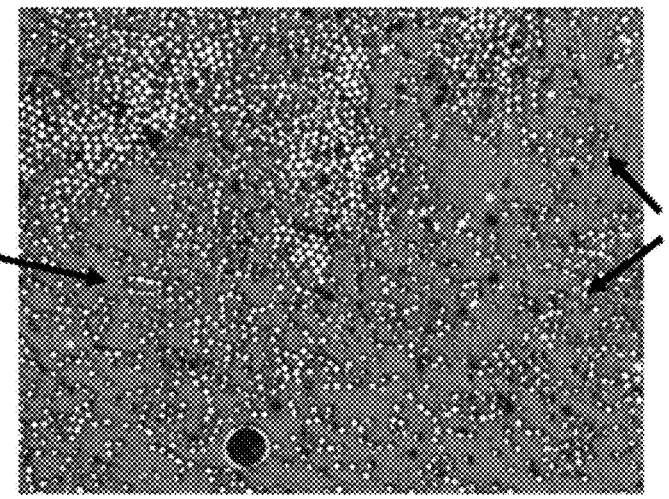
FIG. 7B shows a magnified view of the microstructure of a CMC phase made with continuous carbon fiber (shown in white) impregnated with PPS (shown in grey).
Figure 7A:
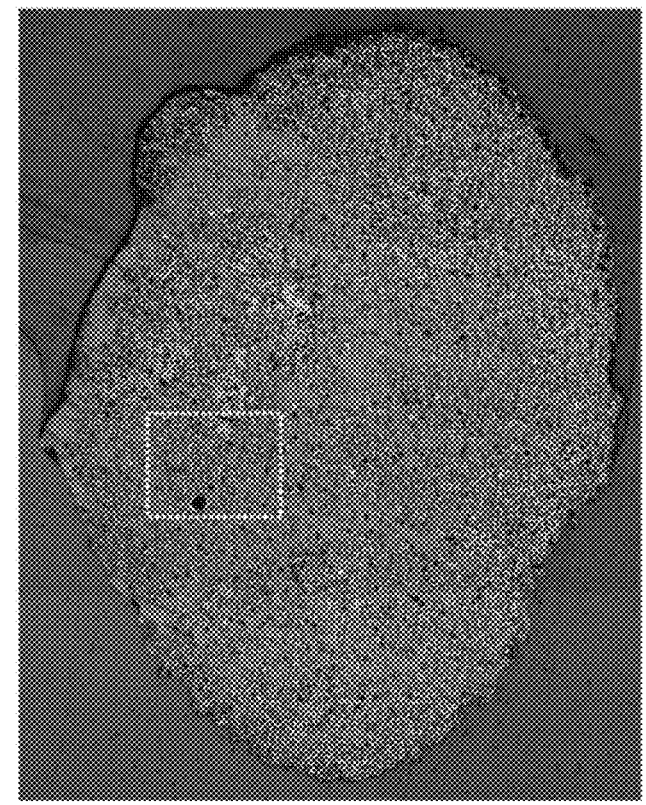
FIG. 7A shows the microstructure of a CMC phase made with continuous carbon fiber (shown in white) impregnated with PPS (shown in grey).

FIG. 7A shows an exemplary microstructure of the CMC phase 6200 shown in FIG. 6. FIG. 7B shows enlarged view of the area designated by white dots in FIG. 7A. Referring to the microstructure of the CMC phase shown in FIG. 7B, the carbon fibers are shown as white circles and are enclosed in the polymer matrix shown in grey, which is a direct representation of the high level of impregnation achieved with the pultrusion process. Hence, the deficient fiber impregnation attained with existing technologies for printing with continuous fibers is mitigated by co-extruding a CMC phase fabricated by pultrusion.

Multiple benefits and a wide range of new possibilities are readily recognized by printing CMCs with the apparatus and methods of this disclosure. However, the benefit of printing with CMCs specifically designed for improving the mechanical properties, namely stiffness and strength, has been investigated through analytical tools. It should be noted that a structural CMC has been already produced with carbon fiber and PPS through an existing pultrusion process. An engineering analysis using micromechanics was carried out to determine the improvement in stiffness achieved by combining the structural CMC phase with a phase containing PPS reinforced with 50% by weight of discontinuous carbon fiber.

The elastic modulus of the composite is greatly influenced by the fiber volume fraction whereas the strength of the composite is greatly influenced by the fiber length. As a result, the contribution of the structural CMC phase to the strength of the printed materials is expected to be more significant than the increase in elastic modulus. Predicting strength requires further understanding of the microstructure developed during in the co-extrusion process with CMC as well as the failure mechanisms governing the strength of the composite, therefore predictions are limited to stiffness thus far.

Figure 8:
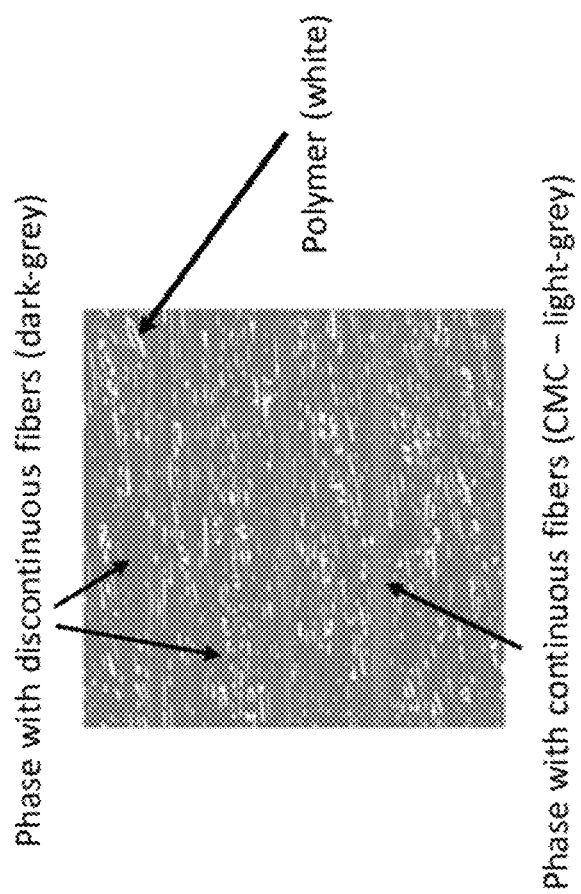
FIG. 8 shows a representative volume element of a multiphase material system utilized in the finite element analysis used in this disclosure.

The finite element method was used to conduct a micromechanical analysis of a mesostructure containing three constituents as shown in the representative volume element (RVE) depicted in FIG. 8. The constituent shown in dark-grey correspond to discontinuous fibers in the molten phase used in the co-extrusion process, whereas the constituent in light-grey corresponds to continuous fibers in the CMC. The third constituent shown in white corresponds to the polymer. The following assumptions were made for the sake of this initial predictions of the elastic modulus: continuous fibers are assumed to be dispersed across the RVE while the orientation was enforced in the print direction; the matrix is assumed to be isotropic and the fibers transversely isotropic. Further, both materials are assumed to behave linearly elastic. The fibers are assumed to be cylindrical with constant diameter and a perfectly bonded or non-slip condition is assumed at the fiber-matrix interface. The orientation of the fibers in the phase with discontinuous fibers does not consider the effect that co-extruding the CMC could have on the final fiber orientation.

Table 1 lists the properties of the constituent materials obtained from the literature cited in this disclosure and used in the prediction of the elastic modulus of the co-extruded material.

TABLE 1

Properties of constituent materials used in micromechanics analysis

| Polyphenylene Sulfide (PPS) | |
|---|---|
| E (GPa) | 3.5 |
| v | 0.3 |
| AS4 Carbon Fiber | |
| $E_1$ GPa) | 235.0 |
| $E_2 = E_3$ (GPa) | 14.0 |
| $v_{12} = v_{13}$ | 0.2 |
| $v_{23}$ | 0.25 |
| $G_{12} = G_{13}$ (GPa) | 28.0 |
| $G_{23}$ (GPa) | 5.5 |

As mentioned before, a volume fraction of 10% of continuous phase was chosen as initial testing condition, which was also used for determining the critical nozzle length. The fiber volume fraction inside the continuous phase is 40% whereas the fiber volume fraction in the phase with discontinuous fiber is 40%. Therefore, the fiber volume fraction of 40% is preserved in the final co-extruded material. With regards to the fiber orientation, the second order orientation tensor known by those skilled in the art $[A]_{cf}$ and $[A]_{df}$ describes the orientation state in the phase with continuous and discontinuous fibers, respectively.

$$[A]_{df} = \begin{bmatrix} 0.8 & 0 & 0 \\ 0 & 0.15 & 0 \\ 0 & 0 & 0.05 \end{bmatrix} \; [A]_{cf} = \begin{bmatrix} 1.0 & 0 & 0 \\ 0 & 0 & 0 \\ 0 & 0 & 0 \end{bmatrix}$$

The elastic modulus in the 1-direction predicted for the system of discontinuous fiber and 10% of CMC and the discontinuous fiber system is reported in Table 2. The value for the discontinuous fiber system agrees with experimental results obtained for the same material system which provides confidence in the predictions made through micromechanics for the material system including CMC.

TABLE 2

Prediction of elastic moduli for material system reinforced with CMC and without CMC

| Property | $V_{df} = 100$ | $V_{df} = 90, V_{cf} = 10$ |
|---|---|---|
| $E_1$ (GPa) | 26.4 | 36.2 |

An improvement of around 37% in the elastic modulus ($E_1$) can be gained by inserting 10% of CMC in the carbon fiber reinforced PPS used for printing. Furthermore, a significant improvement in the strength of the printed composite is expected for the material system including CMCs. These two significant improvements in the mechanical properties of printed composites can enable printing structural components that only required in-plane properties. Nevertheless, this system or apparatus for printing CMC can be readily extended for 3-D printing with multiple axes.

Both the CMC and the apparatus or system for printing with multiple phases were described in this disclosure. A heat transfer analysis of the co-extrusion process was carried out to determine processing conditions needed to melt the polymer in the CMC phase. The results from the heat transfer analysis were used to guide the design process of the co-extrusion nozzle disclosed herein. A control scheme developed for printing with continuous fibers was outlined. Results obtained through micromechanical analysis of the target mesostructure revealed the improvements gained in stiffness due to the addition of continuous fibers.

Tooling, molds, jigs and fixtures used in autoclave and compression molding composites manufacturing are examples of articles produced with the methods and apparatus for co-extruding CMC in the EDAM process.

Based on the above description, it is an objective of this disclosure to describe method of depositing a multiphase material. The method includes providing a CMC phase containing at least one continuous element containing at least one material impregnated in a polymeric matrix; passing the CMC phase containing the at least one continuous element through a feeding system containing a cutting system; producing a predetermined length of the CMC phase containing at least one continuous element by activating the cutting system; providing a flow a molten polymer such that the molten polymer and the CMC phase containing at least one continuous element of predetermined length are merged into a continuous co-extrusion nozzle so as to produce a co-extruded multiphase material; and depositing the co-extruded multiphase material onto a surface. The surface can be part of a substrate, a component or an article. The substrates can be made of metallic, ceramic, or organic materials, such as polymers. The components or articles on which the co-extruded multiphase material can be printed can include, but not limited to articles or components which are additively manufactured or manufactured by other processes.

Examples of at least one continuous element include, but is not limited to, carbon fiber, glass fiber, jute fiber, and aramid fiber. In some embodiments of the method, at least one material can be a semiconductor, such as, but not limited to silicon or a material containing silicon. In some embodiments of the method, at least one material can be a metallic material, such as a metal or an alloy. Non-limiting examples of an alloy suitable for the purpose are Cr—Ni alloy, a Cr—Mo alloy and a Cu—Ni alloy.

In some embodiments of the method described above, the molten polymer can be, but not limited to, a thermoplastic polymer, a thermosetting polymer, or an elastomer. Examples of thermoplastic polymers suitable for the purpose, include, but not limited to, Polyphenylene sulfide (PPS), polypropylene (PP), polyether ether ketone (PEEK) and acrylonitrile butadiene styrene (ABS). Examples of thermosetting polymers suitable for the purposes of the method include, but not limited to, an epoxy, a vinyl-ester and a polyester. Examples of elastomers suitable for the method include, but not limited to, natural rubber, polyurethane, polybutadiene, neoprene, and silicone.

In some embodiments of the method the molten polymer can be made from pellets using a single-screw extruder or an extrusion melt pump. Both these methods are known to those of skilled in the art.

In some embodiments of the method, the molten polymer is reinforced with discontinuous fibers. Examples of such fibers include, but not limited to carbon fibers, glass fibers, jute fibers, and aramid fibers. In some embodiments of the method, the surface is chosen to be detachable from the deposited material. In some embodiments of the method, the surface is a layer of a co-extruded multiphase material. In some embodiments of the method, polymeric matrix contains a thermoplastic resin or a thermoplastic resin or both.

In some embodiments of the method, wherein the at least one material can be more than one material. In such a case, for example, the materials can contain a structural material and a sensing material. Examples of structural materials include, but not limited to a carbon fiber. A non-limiting example of a sensing material is a Cu—Ni alloy wire capable of sensing strain. In some embodiments of the method the more than one material is a combination of a structural material and a heating material. A non-limiting example of a heating material is Ni—Cr alloy.

Those skilled din the art will readily recognize the above methods to be suitable for additive manufacturing of articles and components.

In some embodiments of the method, the at least one continuous element can be a plurality of continuous elements. In such a case, where the method uses two or more continuous elements, different continuous elements can be utilized to achieve the same function or different functions.

In some embodiments of the method, the surface on which the multiphase material can be can be a layer of a co-extruded multiphase material. This also means multiple layers of the multiphase material can be deposited utilizing the methods of this disclosure.

It should be recognized that in the methods described above, one continuous element can contain one or more materials. The materials in a continuous elements can all have same function or different functions.

It can be seen from the above that a variety of functionalities for the printed multiphase material or possible by judicious selection of the continuous elements and by the selection of materials used in the continuous elements.

It is another objective of this disclosure to describe an apparatus for depositing a multiphase material. The apparatus includes a feedings system capable of continuously feeding a CMC phase containing continuous elements, and containing a cutting system capable of producing a predetermined length of the CMC phase containing continuous elements; a co-extrusion nozzle comprising a flow channel; a means to introduce the predetermined length of the CMC phase containing continuous elements into the flow channel of the co-extrusion nozzle; and a means to introduce a molten polymer into the flow channel such that the molten polymer and the predetermined length of the CMC phase containing continuous elements are co-extruded and deposited on a surface. The apparatus can thus be used to produce an article or a component by additive manufacturing.

It can be seen that the methods and apparatus disclosed can be can be utilized to produce an article or a component. It is also an objective of this disclosure to describe an article or component comprising a CMC phase containing continuous elements embedded in a polymer resin forming a multiphase structure. In some embodiments of the article, the continuous elements provide both mechanical strength and a sensing capability. The continuous elements suitable for the CMC phase and the polymer resin have been described above with reference to the methods detailed above for fabricating a component. The sensing capability can be utilized to sense strain, temperature or pressure as non-limiting examples. Examples of structural materials include, but not limited to, carbon fibers. A non-limiting example of a sensing material is a Cu—Ni alloy wire capable of sensing strain. It should be recognized that in some embodiments of the articles of this disclosure different elements of the CMC phase can perform different functions. For example an element can provide mechanical strength while a second element can be utilized as a sensor for strain. It is to be recognized that in some embodiments, the same element embedded in the CMC phase can perform multiple functions.

The invention has been described in detail with particular reference to certain preferred aspects thereof, but it will be understood that variations, combinations, and modifications can be effected by a person of ordinary skill in the art within the spirit and scope of the invention. Other implementations may be possible.

The invention claimed is:

1. An additive manufacture article comprising a CMC phase containing continuous elements embedded in a polyphenylene sulfide polymer resin forming a multiphase structure.

2. The article of claim 1, wherein the continuous elements provide mechanical strength and a sensing capability.

3. The article of claim 1, wherein the sensing capability relates to sensing one of strain, temperature, and pressure.

\* \* \* \* \*